(12) United States Patent
Öberg

(10) Patent No.: US 6,400,993 B1
(45) Date of Patent: Jun. 4, 2002

(54) PROCESS OPTIMATION

(75) Inventor: Tomas Öberg, Lyckeby (SE)

(73) Assignee: Grabitech Solutions AB (SE)

( * ) Notice: Subject to any disclaimer, the term of this patent is extended or adjusted under 35 U.S.C. 154(b) by 0 days.

(21) Appl. No.: 09/551,318

(22) Filed: Apr. 18, 2000

Related U.S. Application Data
(60) Provisional application No. 60/130,262, filed on Apr. 21, 1999.

(51) Int. Cl.$^7$ .............................................. G05B 13/02
(52) U.S. Cl. ......................................... 700/33; 700/32
(58) Field of Search ....................... 700/32, 33; 706/16, 706/23; 431/14, 75, 76

(56) References Cited

U.S. PATENT DOCUMENTS 5,586,049 A * 12/1996 Kurtzberg et al. .......... 364/499
5,715,165 A * 2/1998 Luh et al. ............... 364/474.15

OTHER PUBLICATIONS

Betteridge, D. et al, Talanta, vol. 32, No. 8B, pp. 723–734, 1985.

Nelder, J. A. et al, National Vegetable Research Station, Wellesbourne, Warwick, pp. 308–313, 1965.

The Basic Simplex Algorithm, pp. 46–49 (Date Unknown).

Spendley, W. et al, Technometrics, vol. 4, No. 4, Nov. 1962, pp. 441–461.

* cited by examiner

Primary Examiner—Paul P. Gordon

(57) ABSTRACT

The present invention relates to methods, devices, program products for optimizing the response of a process system comprising K variables (x, y), wherein the invention comprises the steps of using an optimization algorithm to calculate the vertices of a simplex, polyhedron or hyper-polyhedron; defining a minimum step size ($x_{min}$, $y_{min}$) and/or a maximum step size ($x_{max}$, $y_{max}$) for at least one of said variables (x, y); repositioning said calculated new vertices (R,C, $C_R$, $C_W$, E) if a step size projected in the direction of said least one variable (x, y) between said new vertex or vertices (R, C, $C_R$, $C_W$, E) and a predefined or calculated or selected point or line or plane or hyperplane is less than said minimum step size ($x_{min}$, $y_{min}$) and/or greater than said maximum step size ($x_{max}$, $y_{max}$); and setting the control variables to the values of the calculated vertex or values of the calculated vertices which give a step size greater than the minimum step sizes and/or give a step size less than the maximum step sizes.

12 Claims, 5 Drawing Sheets

PROCESS OPTIMATION

This application claims priority on provisional Application No. 60/130,262 filed on Apr. 21, 1999, the entire contents of which are hereby incorporated by reference.

TECHNICAL FIELD OF THE INVENTION

The present invention relates to methods, devices, systems and computer program products for optimising the performance of processes or systems.

DESCRIPTION OF RELATED ART

When optimising the performance of technical systems and processes such as, for example, the combustion of fuel, the production of chemical or biochemical products or the machining of parts, it is often necessary to adjust the control variables and measure the responses of the processes or systems to the adjustments in order to find the best possible response or a region in which all responses are adequate. Usually many conflicting responses must be optimised simultaneously, in the burning of fuel it may be desired to have as complete combustion as possible while at the same time it is necessary to hold the combustion temperature below a certain temperature and also to reduce the emissions of oxides of nitrogen to a low level. In the case of a paper producing machine the desired response may be "formation", i.e. the uniformity of fibres in a sheet of paper while the control variables could be; slice lip position; head box tilt angle; vacuum valve positions; and chemical additive flow. In pulp bleaching the desired response could be chemical cost with targets for brightness, final pH and remaining peroxide while the control variables could be temperature, peroxide levels and alkali flow rate. One way of optimising a process or system is by non-systematic "trial and error" and another way is by changing one control variable at a time while holding the rest constant. Both of these methods are time-consuming and are ineffective at taking into account dynamic changes in the process or system, for example, changes in the composition of the fuel in a combustion process or system. In 1962 an efficient sequential optimisation method called the basic simplex method was presented by Spendley et al in an article called "Sequential Application of Simplex Designs in Optimisation and Evolutionary Operation" in Technometrics Vol. 4, No. 4, November 1962, pages 441–461. The basic simplex method is based on an initial set of k+1 trials where k is the number of variables. A k+1 geometric figure in a k-dimensional space is called a simplex and the corners of the simplex are called vertices (see FIG. 1). With two variables (k=2) the initial simplex set consists of three trials (k+1) where each trial forms a vertex of the simplex. This number of trials corresponds to the minimum necessary for defining a direction of improved response and is ail economical and time-saving way to start an optimisation project. After the initial trial set the simplex process is sequential with the rejection of one of the current trials and the addition and evaluation of one new trial at a time. The algorithm that the simplex process follows contains the following steps:

- reject the trial with the least favourable response value in the current simplex;
- calculate a new set of control variable levels (a "trial") by reflecting into the control variable space opposite the least favourable result;
- replace the rejected trial by the new trial to form a new simplex; and,
- then return to the first step.

This algorithm can continue indefinitely or call stop or pause after a certain number of steps or when a target performance has been obtained.

If the calculated reflection in the control variables produces a least favourable result then the simplex will oscillate between this trial and the previous rejected trial, This can be avoided by applying the rule that it is not permitted to return to a trial that has just been rejected. Instead the second least favourable trial is rejected and the next simplex is reflected away from it.

To prevent the simplex becoming stuck around a false favourable response, any trial that has been retained for a specified number of steps is re-evaluated. In order to prevent the simplex violating the effective boundaries of the control variables, a check is made of intended trials before they are implemented and if they would violate the control boundaries a very unfavourable response value is instead applied in order to force the simplex back within the specified boundaries.

The simplex method leads systematically to the optimum levels for the control variables.

The simplex method finds the optimum response with fewer trials than the non-systematic approaches or the method of changing one variable at a time. The simplex method is also easily automated. Further research in the field of optimisation has led to an improved simplex method called the modified simplex method. This is described in an article called "A simplex method for function minimization" in "Computer Journal", Vol. 7, 1965, pages 308–313, by Nelder and Mead.

The modified simplex algorithm is a variable size simplex in which the simplex expands in the direction of more favourable conditions and contracts if a move was taken in the direction of less favourable conditions. The expansion and contraction enable the simplex to accelerate along a successful track of improvement and to home in on the optimum conditions. The modified simplex therefore usually reaches the optimum region more quickly than the basic simplex method and it can pinpoint the optimum levels more closely.

A number of other modifications of the Nelder and Mead method has been presented. Several of those other modified methods are described in an article called "Reflections on the modified simplex II" in "Talanta", Vol. 32, No. 8B, pages 723–734, by Betteridge and Wade, and in the textbook "Sequential simplex optimization", CRC Press, 1991, ISBN 0-8493-5894-9, by Walters, Parker, Morgan and Deming. Some examples of those other modified methods are the weighted centroid simplex, the super-modified simplex, the controlled weighted simplex, and the composite modified simplex.

In addition to simplex and modified simplex algorithms there are other optimisation algorithms such as genetic algorithms and simulated annealing algorithms where each iteration can be described as a move from one polyhedron or hyperpolyhedron to another one.

A problem with the modified simplex methods or other polyhedron or hyperpolyhedron based optimisation algorithms is that it can be difficult or even impossible for them to detect when process or system conditions change. This is because as they home in onto the optimum response the simplexes, resp. polyhedrons resp. hyperpolyhedrons contract. This leads to insensitivity, as the step size may be too small to detect any noticeable difference in the performance of the process or system. If the process or system conditions change so that there is a new optimum response, which is not detected by the contracted simplex resp. polyhedron, resp. hyperpolyhedron then the new optimum response will not be found.

SUMMARY

The object of the invention is to provide methods, devices, systems and computer program products for overcoming some or all of the above stated problems.

The present invention solves at least some of the above stated problems by means of methods having the features mentioned in the characterising part of claim 1.

The present invention solves at least some of the above stated problems by means of computer program products having the features of claim 7.

The present invention solves at least some of the above stated problems by means of computers having the features of claim 8.

In a method in accordance with a first embodiment of the present invention, a method for optimising a process or system has an optimisation algorithm, which is provided with a method for controlling the minimum size of an optimisation step so that it can react more quickly to changes in the conditions of a process or system.

In a second embodiment of the present invention, a method for optimising a process or system has an optimisation algorithm that is provided with a method for controlling the maximum size of an optimisation step in order to prevent it from oscillating around but never entering the optimum region if the width of the optimum region is much smaller than the step size.

In a further embodiment of the present invention, a method for optimising a process or system has an optimisation algorithm that is provided with a method for controlling both the maximum and minimum sizes of an optimisation step in order to achieve both of the above-mentioned effects.

In a further embodiment of the present invention, the methods for controlling the minimum and/or maximum sizes of an optimisation step can be selectively deactivated in order to allow a user to, for example, reduce the sensitivity of the optimisation algorithm and/or to allow a rapid but coarse initial optimisation of the optimisation algorithm.

The invention will be described more closely in the following by means of non-limiting examples of embodiments and figures which illustrate the inventive concept applied to an optimisation method of the modified simplex type.

DETAILED DESCRIPTION OF EMBODIMENTS

Figure 1:
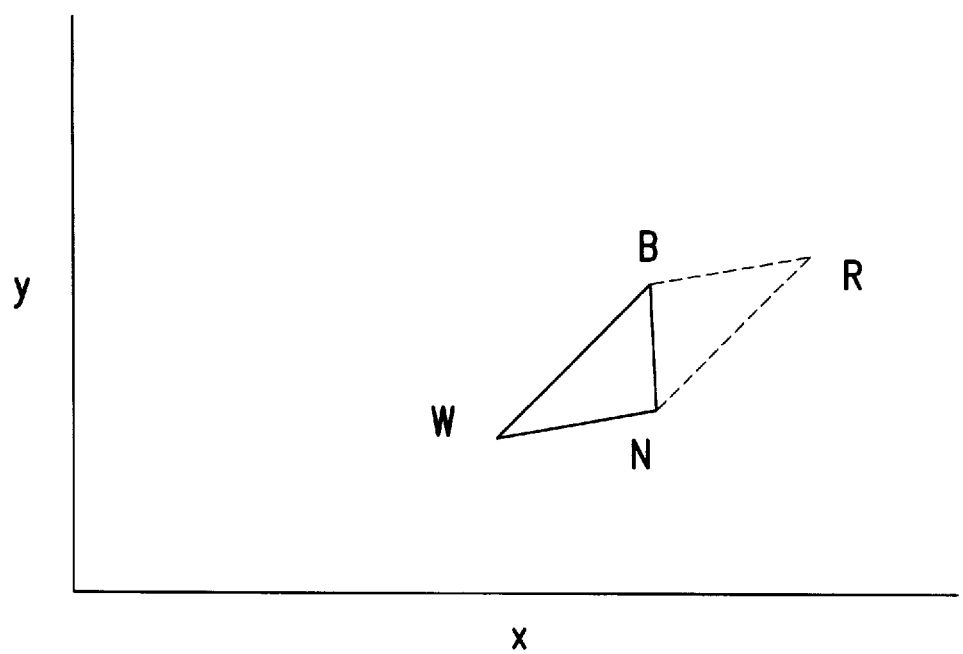
FIG. 1 shows the elements of a simplex for two control variables x and y.

FIG. 1 shows the elements of a simplex for two control variables x and y. For example, in a waste incinerating process or system, control variable x can be the amount of exhaust gases which are reintroduced in the furnace, control variable y can be the amount of area added to the furnace and the desired response is a decrease in the amount of $NO_x$ released. Three trials W, N and B are made in the first step of the simplex method for two variables, where W gives the worst response, i.e. the highest amount of $NO_x$ released, N gives the next to worst response and B gives the best response. In the next step of the simplex method the trial W which gave the worst response is rejected and a new simplex (shown with dashed lines) is formed using points N, B and R, where R is a new trial using the values of the control variables x and y which can be found at the position of the reflection of trial W through the average of trials N and B.

Figure 2:
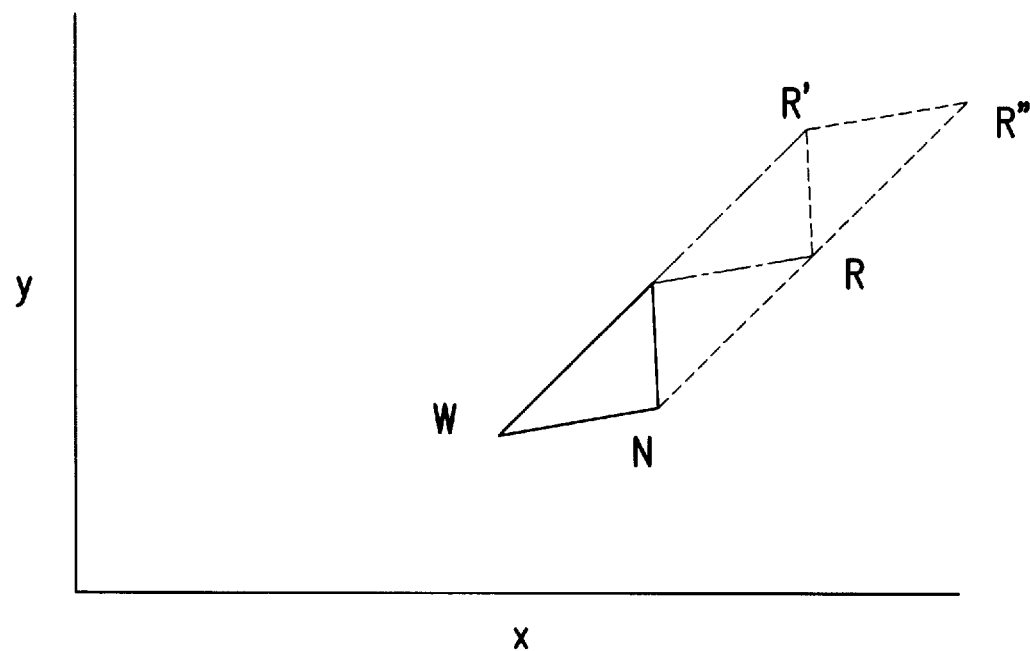
FIG. 2 shows a typical optimisation sequence using the basic simplex method
Figure 3:
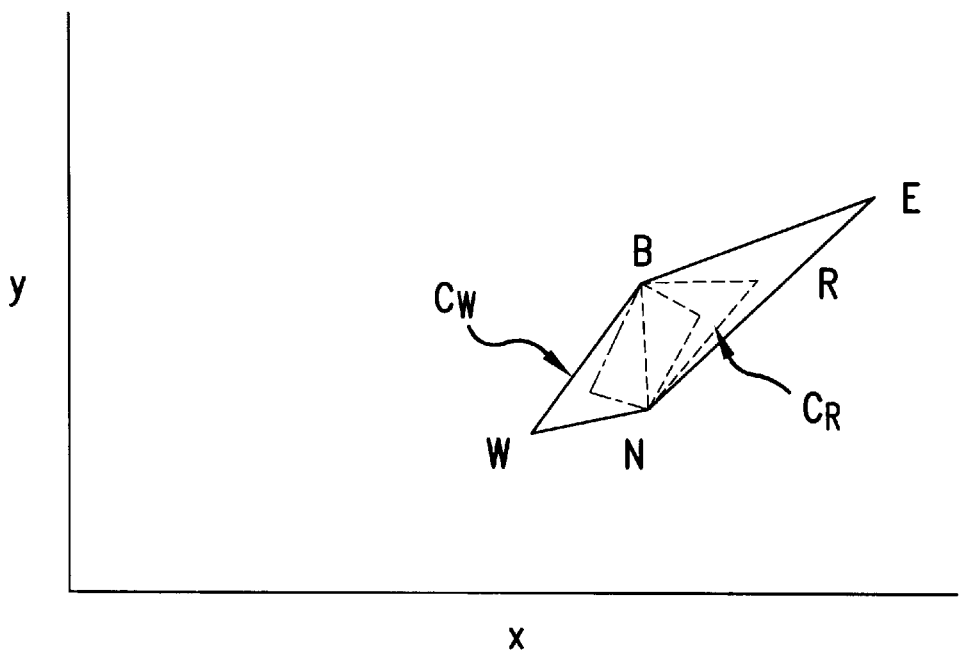
FIG. 3 shows the elements of a modified simplex for two control variables

FIG. 2 shows 4 steps in a typical optimisation sequence using the simplex method, The first two steps are the same as described for FIG. 1. In the third step the vertex N from the earlier steps is rejected. A new simplex is then formed using points B, R and R', where R' is a new trial which is positioned at the reflection of trial N through the average of trials B and R. If vertex B now gives the worst response it is rejected. A new simplex is then formed using points R, R' and R", where R" is a new trial which is positioned at the reflection of trial B through the average of trials R and R', FIG. 3 shows the elements of a prior art modified simplex for two control variables, In the modified simplex a following step can expand in the direction of more favourable conditions, as shown by E, or contract as shown by $C_W$ and $C_R$, where $C_W$ represents a negative contraction, i.e. a contraction in the direction towards the worst vertex W, and $C_R$ represents a positive contraction, i.e. a contraction in the direction towards the reflection R of the worst vertex.

Figure 4:
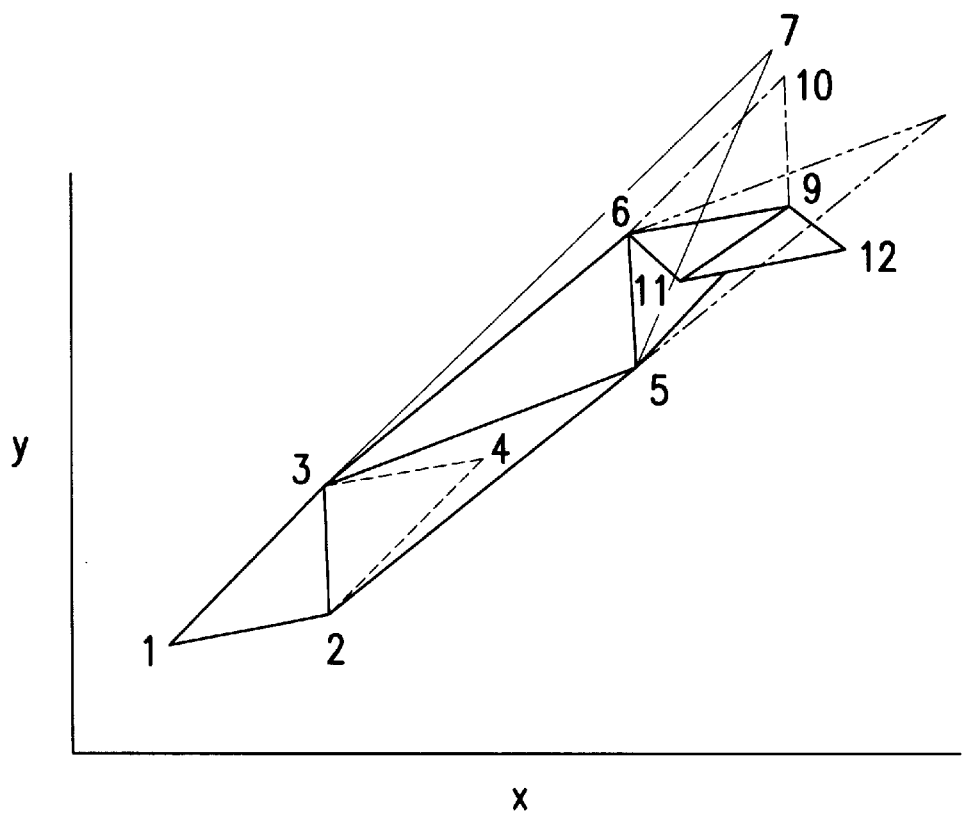
FIG. 4 shows a typical optimisation sequence using the modified simplex method.

FIG. 4 shows 7 steps in a typical optimisation sequence using the prior art modified simplex method. The initial simplex consists of vertices 1, 2 and 3. The simplex begins with a reflection to point 4 followed by a successful expansion leading to a second simplex containing the vertices 2, 3 and 5. The next step is a reflection to point 6 followed by a failed expansion to point 7 (i.e. point 7 fives a less satisfactory result than point 6) leaving the reflection simplex containing the vertices 3, 5 and 6. The next move is a reflection to point 8 that gives a poor result but not as poor as the result of vertex 3 so a $C_R$ contraction is applied which results in the fourth simplex containing the vertices 5, 6 and 9, The following step is a reflection to point 10 which gives a worse result so it leads to a $C_W$ contraction which leads to the fifth simplex 6, 9 and 11. Simple reflection of this simplex gives the simplex 9, 11 and 12. The last few steps take place in a small region of diagram and if the responses of the trials are similar then new trials will tend to collect in this small region. This is because the continued contractions lead to the steps getting closer and closer together. If the conditions of the process or system change, for example, in a combustion process or system, if the temperature changes or the air/fuel ratio is changed, such that a better performance is available in another region while at the same time the signal-to-noise ratio in the first region is inadequate so that small improvements are not detected, then the step size may be so small that the modified simplex never leaves the first region or it may take a long time to leave that region.

Figure 5:
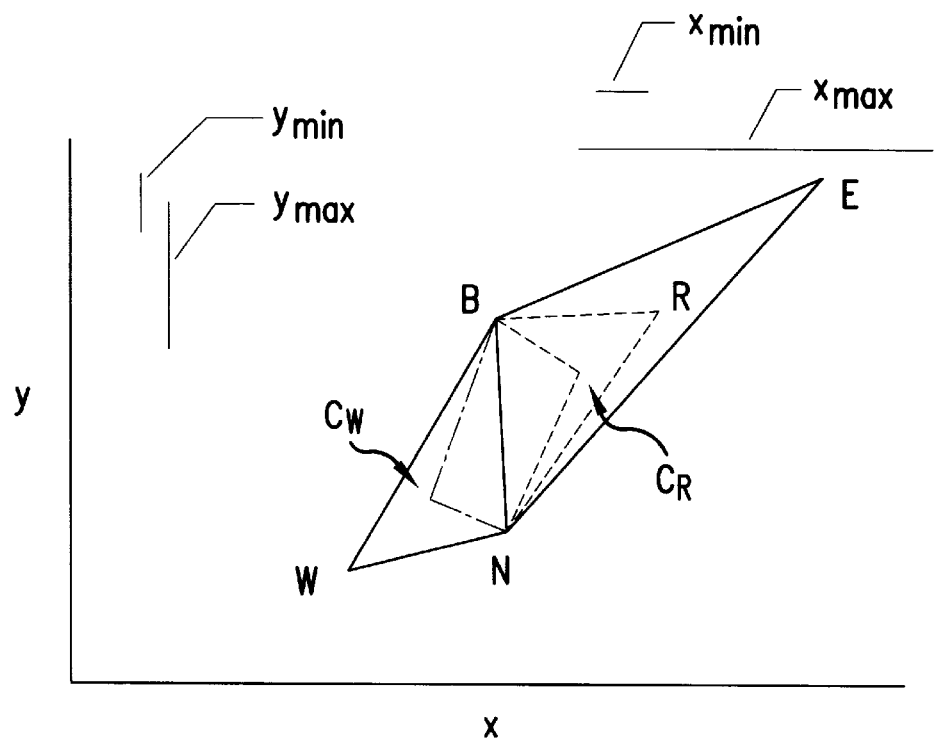
FIG. 5 shows the elements of a modified simplex in accordance with an embodiment of the invention.

FIG. 5 shows the elements of a modified simplex that has been further modified in accordance with a first embodiment of the present invention. In this further modified simplex each control variable x, y has an associated minimum step size, $x_{min}$, $y_{min}$, respectively. The minimum step sizes can be given a certain value by a user or they can be changed during the sequence to take into account variations in the conditions. For example, the minimum step size could be a proportion, e.g. one quarter, of the average step size during the last n steps, where n preferably can be adapted by an operator or be adapted by a program. The projected distance in the direction of each variable of the new vertex from the other vertices in the new simplex is calculated. If a calculated trial would result in a new vertex which is less than the defined minimum step size for one of the variables from all other vertices in the simplex then this vertex is rejected and a further new vertex is calculated in which the step sizes for the variables are equal to or greater than their respective minimum step sizes. In this way the size of the steps for each variable is prevented from becoming so small that it takes a large number of steps for the optimisation sequence to react to chances in the operating conditions.

It is also possible to arrange that the minimum step sizes can be selectively ignored during part of the optimisation sequence. This can be useful if it is suspected that one or more of the chosen minimum sizes are too large and are therefore preventing the optimisation sequence from homing-in on the optimum conditions.

In a second embodiment of the invention a modified simplex is further modified by each variable x, y having an associated maximum step size $x_{max}$, $y_{max}$, respectively. The maximum step sizes can be given a certain value by a user or they can be changed during the sequence to take into account variations in the conditions. For example the maximum step size could be a proportion, e.g. twice the average step size during the last n steps. In this way the size of the steps for each variable are prevented from becoming too large which can lead to the optimisation sequence oscillating round but never finding the optimum region if the width of the optimum region is much smaller than the step size. The projected distance of the new vertex in the direction of each variable from the other vertices in the new simplex is calculated. If a calculated new vertex would result in a step size for a variable which is greater than the maximum step size permitted for the variable then this vertex is rejected or a further new vertex is calculated in which the step size is equal to or less than the maximum permitted step size for that variable.

It is also possible to arrange that the maximum step sizes can be selectively ignored during part of the optimisation sequence. This can be useful if it is suspected that one or more of the chosen maximum sizes are too small and are therefore preventing the optimisation sequence from rapidly homing-in on the optimum conditions.

In a third embodiment of the invention, a modified simplex is provided with both minimum and maximum step sizes for each variable x, y in order to achieve the advantages of both the first and second embodiments.

Figure 6:
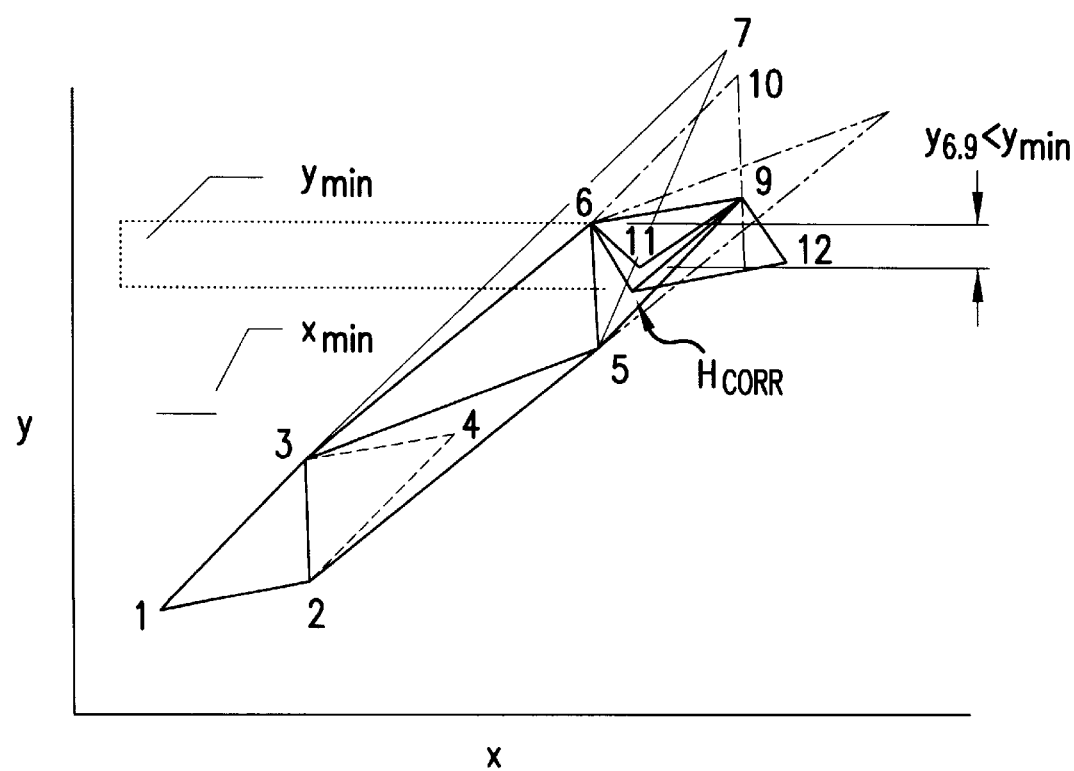
FIG. 6 shows a typical optimisation sequence using a modified simplex method adapted in accordance with an embodiment of the invention.

FIG. 6 shows a typical optimisation sequence similar to the first 5 steps used in FIG. 4 but using, a modified simplex method adapted in accordance with the first embodiment of the present invention. In this example in the fifth step of the method the projected contraction in the y direction for the step to the vertex 11 from vertex 10 has a length $Y_{6-9}$ which is less then $y_{min}$. This step is therefore rejected and a new corrected vertex $11_{CORR}$ is calculated for which the projected step in the y direction is equal to or greater than $y_{min}$. In this example the new calculated vertex is found by a contraction through the average of the previous trials 6 and 9, in which instead of contracting by a factor of 50% the contraction is adapted so that the projected distance of $11_{CORR}$ from vertices 6 and 9 is at least $y_{min}$. The contraction could be, for example, by a factor of only 20% or 25%. In the next step of the simplex point 12 is found using point 6 reflected through the line joining vertices 9 and $11_{CORR}$.

Figure 7A:
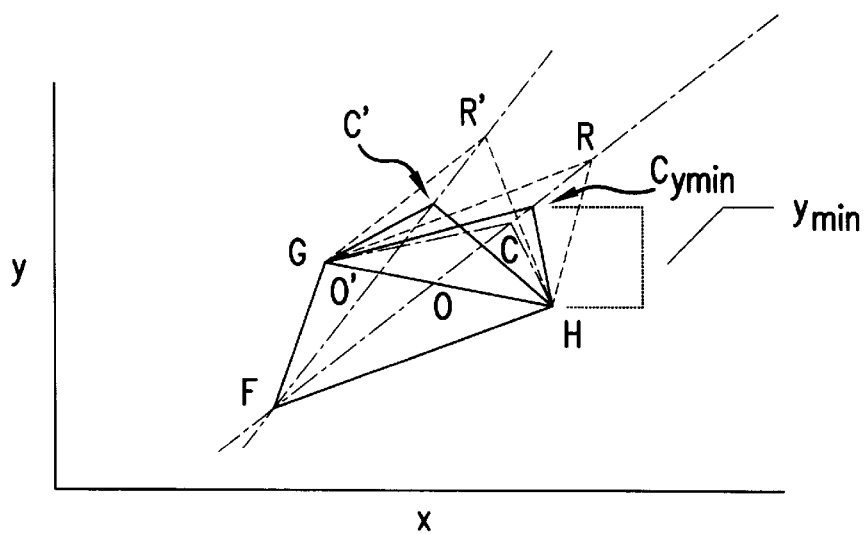
FIGS. 7*a*, 7*b*, and 7*c*) show examples of possible adjustment steps in accordance with embodiments of the present invention.

In a further embodiment of the invention, the corrected vertex can be found by reflection and subsequent contraction through some other point on the line connecting the remaining vertices. An example of this is shown in FIG. 7a). In this case the vertex R, found by the reflection of vertex F of simplex FGH through point O, is contracted to give vertex C. The step in the y direction to C is less than $y_{min}$ and therefore C is rejected and a new vertex must be found. In this case the point of reflection is shifted to a new position, for example half way between G and O, to give a new point of reflection O'. A new reflection R' is calculated and contracted to give vertex C'. This vertex has a projected step in the y direction, which is greater than $y_{min}$ and is therefore accepted. If this vertex C' had a projected step in the y direction which was less than $y_{min}$ then a new position O" would be chosen and new vertices R" and C" tested. While this embodiment has been illustrated by a shift of the point O to a position halfway between O and G it is of course conceivable to use any other suitable shift size, for example 10% or 25% of the distance between O (or O') and G.

Figure 7B:
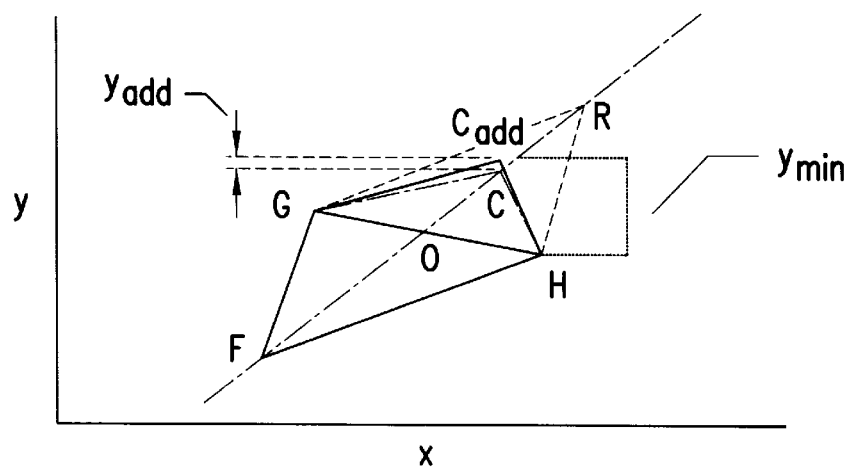

FIG. 7b) shows a further embodiment of the invention in which a new vertex $C_{add}$ is found by adding a step $y_{add}$ in the y direction to a vertex C which has a step in the y direction which is less than $y_{min}$. Step $y_{add}$ can be calculated to be exactly large enough so that the new vertex $C_{add}$ exactly fulfills the conditions of $y_{min}$ or a standard step in the y direction $y_{scan}$ can be predetermined and used. In this case the standard step may need to be added to the vertex C a number ofttimes before the step in the y direction is equal to or greater than $y_{min}$.

Figure 7C:
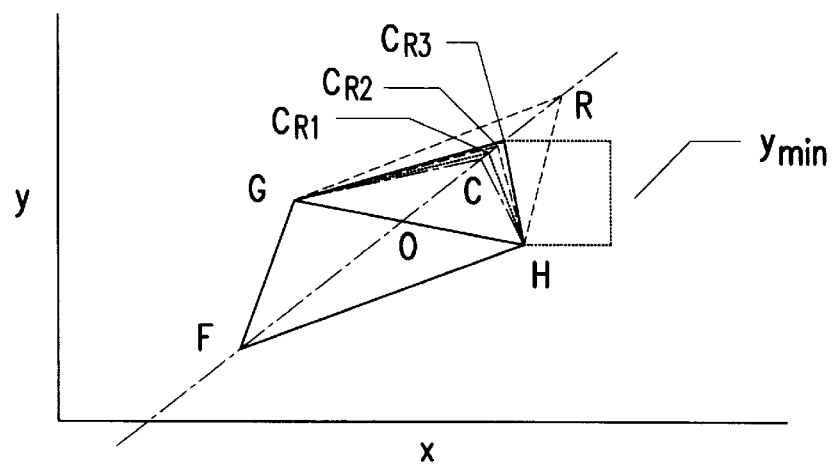

FIG. 7c) shows yet another embodiment of the invention in which a new vertex $C_{it3}$ is found by an iterative process. in this case vertex C has a step in the y direction which is less than $y_{min}$. A new point $C_{it1}$ is found by shifting C a distance along the line joining O and reflection R. This distance that C is shifted can be any suitable amount, e.g. 10% or 20% of the distance from O to C or a fixed distance e.g. 1 unit. vertex $C_{it1}$ has a step in the y direction which is less than $y_{min}$ a new point $C_{it2}$ is found by shifting $C_{it1}$ a distance along the line joining O and reflection R. This can be continued until a point, in this example $C_{it3}$, is found which has a step in the y direction which is greater than $y_{min}$.

The above examples have illustrated the case where the step in the y direction is less than $y_{min}$ but the inventive concept is equally applicable to the cases where the step in the x (and other dimensions K, if present) is less than $x_{min}$, (resp. $K_{min}$).

Similar but opposite measures to those described above can be taken if a calculated vertex would cause a step that is greater than $x_{max}$, and/or $y_{max}$, i.e. an expansion could be reduced to, for example, 125% or 150% from 200% and a contraction increased to 75% instead of 50%.

The invention is naturally not limited to optimisation problems having just 2variables but can be adapted to any number K of variables. The invention is also not limited to the simplex optimisation methods with only K+1 vertices in each step, but can be adapted to any optimisation method, such as genetic algorithms, simulated annealing algorithms, etc, where each step is defined by a finite number of vertices confining a polyhedron or hyperpolyhedron. It is also conceivable that only some variables are provided with maximum and minimum step sizes while other variables have unlimited step sizes.

Furthermore the invention is not limited to the case when the minimum or maximum step size is defined by the distance between a vertex and all other vertices in the simplex, polyhedron or hyperpolyhedron but it they can be defined in other ways, for example the distance from the vertex and some other predefined, calculated or selected point or line or plane such as the point of reflection or the line or plane joining the other vertices or the nearest and/or furthest other vertex, etc., or a combination thereof.

The present invention can be realised in the form of a computer program product, called "software" in the following for the sake of brevity, for use in a computing device such as a main frame computer, micro computer, personal computer, microprocessor or the like, called "computer" in the following for the sake of brevity, for controlling a process or system or the like. In the case of a process, the software can be executed on a suitable process control computer that is connected by interfaces to process actuators and sensors. The process actuators can be, for example, remotely controlled valves, which can be opened or closed in response to a signal from the control computer in order to change control variables. The sensors can, for example, be temperature sensors or humidity sensors or sensors adapted to measure concentrations of chemicals such as oxygen, carbon monoxide or $NO_x$. If the software is intended to achieve a reduction in the $NO_x$ released from a combustion process in which the control variable which the software can change are the amount of urea added to the combustion process and the amount of exhaust gases recirculated, then the control outputs of the control computer would be interfaced to an actuator for a valve for controlling the amount of urea (called a urea valve from now on in the interest of brevity) and an actuator for a valve for controlling the exhaust gas recirculation (called a recirculation valve from now on in the interest of brevity). The control computer inputs would be interfaced to a sensor for measuring the amount of $NO_x$ in the exhaust and other sensors for measuring parameters which are of interest from a process standpoint (e.g. combustion temperature, exhaust temperature, amount of ammonia in the exhaust, air/fuel ratio etc.) but which are not relevant to the explanation of how the present invention functions and are therefore omitted from this description.

Figure 8:
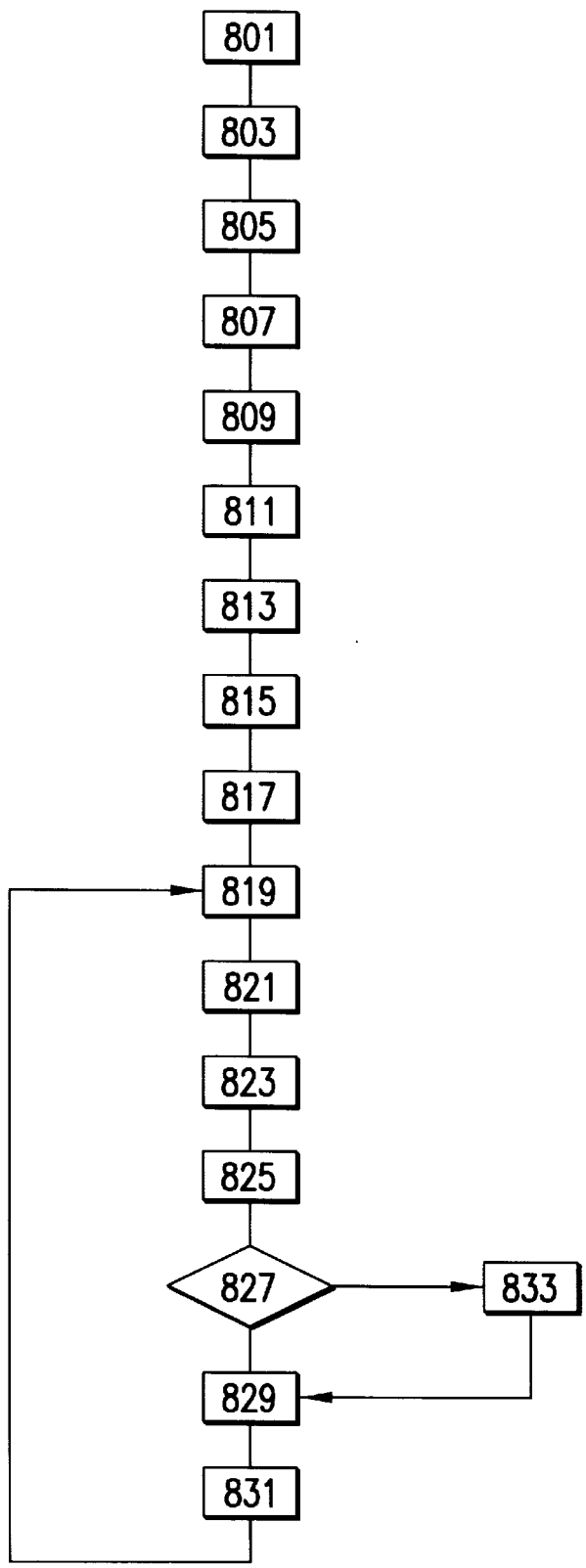
FIG. 8 is a flow diagram representing a method in accordance with the first embodiment of the invention.

The software in accordance with the first embodiment of the invention performs the following, functions, as illustrated in a flow diagram in FIG. 8: in step 801 it sets each of the control variables, i.e. amount of urea added (called control variable "x") and amount of exhaust gases recirculated (control variable "y") to a first value. In step 803 it then monitors the combustion process until it reaches a steady state and then in step 805 measures and records the first steady state response of the combustion process, where the response that is measured is the concentration of $NO_x$ in the exhaust gases. Once a steady state concentration of $NO_x$ has been measured, i.e. the first response has been detained, the software changes the control variables x, y to new second values in step 807, monitors the combustion process until it reaches a steady state 809 and measures and records the second steady state response of the system in step 811. The other control variables of the system are kept constant. Once this second response has been determined the software changes the control variables x, y to new third values in step 813, monitors the combustion process until it reaches a steady state in step 815 and measures and records the third steady state response of the system in step 817. In step 819 the software orders the 3 responses in order of worst to best system response, for example, let us assume that the first trial W gives the worst response (i.e. has the highest $NO_x$), the second trial N is better and the third trial B is best. These three trials are used by the software in step 821 as vertices in a simplex. The software is provided with a modified simplex type algorithm that is used in step 823 for calculating a new simplex vertex R based on the three original vertices. For example, the trial W which gave the worst response is rejected by the software and a new simplex is formed using vertices N, B and R, where R is a new vertex corresponding to a new trial that uses the values of the control variables x and y which can he found at the position of the reflection of trial W through the average of trials N and B. In step 825, the software calculates for each control variable x, y the projected step size in the direction of each control variable from the new vertex R and the other vertices. The software is provided with accessible memory or other storage means for storing minimum values of each control variable x, y, for the projected step sizes in the directions of the control variables i,e. minimum step sizes $x_{min}$, $y_{min}$, respectively. The minimum step sizes can be given a certain predetermined value by a user or they can be changed by the software during the sequence to take into account variations in the conditions. For example, the minimum step size could be a proportion, e.g. one quarter, of the average step size during the last n steps. As mentioned above, the projected distance in the direction of each variable of the new vertex R from the other vertices N, B in the new simplex is calculated in step 825 and in step 827 each of these projected. distances are compared against the appropriate minimum step size. If a calculated trial would result in a new vertex R which is greater than the defined minimum step size for the variables from all other vertices in the simplex then in step 829 the control variables are set to the values found at vertex R and the process is continued until a steady state is reached. The response of the system to the values of the control variable x, y at R is measured in step 831. The software then returns to step 819 and uses R instead of W for calculating a new simplex, again using the rules in accordance with the present invention regarding expansion, reflection and contraction mentioned above.

However, if a trial calculated at step 825 would result in a new vertex R which at step 827 is found to be is less than the defined minimum step size for one of the variables from all other vertices in the simplex then this vertex is rejected and at step 833 a further new vertex $R_{NEW}$ is calculated in which the step sizes for the variables x, y are equal to or greater than their respective minimum step sizes, $x_{min}$, $y_{min}$. The software then goes to step 829 and adjusts the control parameters x, y of the process to the values found at $R_{NEW}$ and lets the process continue until a steady state is reached. The response of the system to the values of the control variable x, y at $R_{NEW}$ is measure at step 831 and a new simplex is calculated, using the rules in accordance with the present invention regarding expansion, reflection and contraction mentioned above.

In order to save computing time, the software may alternatively be programmed to first identify which of the earlier vertices is/are closest to the new vertex R in each of the projected directions of the control variables and then to just calculate the minimum step size between the new vertex R and the vertex which is nearest to it in the projected direction of the control variable. If the step to this vertex is greater than the minimum step size for that control variable, then the step size for all vertices which are further away from the new vertex will also be greater than the minimum step size and it is therefore unnecessary to repeat the comparison for all the vertices.

The use of a minimum step size can preferably be selectively activated and deactivated in order to allow an operator to influence the progression of the optimisation method. The minimum step sizes used by the software preferably are made adjustable as mentioned earlier in this description.

In a second embodiment of the present invention, the software of the type described in connection with the first embodiment of the present invention is provided with accessible memory or other storage means for storing maximum values of each control variable x, y, for the projected step sizes in the directions of the control variables i.e. maximum step sizes $x_{max}$, $y_{max}$, respectively. The maximum step sizes can be given a certain predetermined value by a user or they can be changed by the software during the sequence to take into account variations in the conditions. For example, the maximum step size could be a proportion, e.g. one quarter, of the average step size during the last n steps. In analogy with the method of the first embodiment of the present invention mentioned above, the projected distance in the direction of each variable of the new vertex R from the other vertices N, B in the new simplex is calculated. If a calculated trial would result in a new vertex R which is closer than the define maximum step size for the variables from all other vertices in the simplex then the control variables are set to the values found at vertex R and the process is continued until a steady state is reached. The response of the system to the values of the control variable x, y at R is measured and a new simplex is calculated, using the rules in accordance with the present invention regarding expansion, reflection and contraction mentioned above.

However, if a calculated trial would result in a new vertex R which is further than the defined maximum step size for one of the variables from all other vertices in the simplex then this vertex is rejected or a further new vertex $R_{NEW}$ is calculated in which the step sizes for the variables x, y are equal to or less than their respective maximum step sizes, $x_{max}$, $y_{max}$. The software then adjusts the control parameters x, y of the process to the values found at $R_{NEW}$ and lets the process continue until a steady state is reached. The response of the system to the values of the control variable x, y at $R_{NEW}$ is measured and a new simplex is calculated, using the rules in accordance with the present invention regarding expansion, reflection and contraction mentioned above.

In order to save computing time, the software may alternatively be programmed to first identify which of the earlier vertices is/are furthest from the new vertex R in each of the projected directions of the control variables and then to just calculate the maximum step size between the new vertex R and the vertex which is furthest from it in the projected direction of the control variable. If the step to this vertex is smaller than maximum step size for that control variable, then the step size for all vertices which are closer to the new vertex will also be less than the maximum step size and it is therefore unnecessary to repeat die comparison for all the vertices. The use of a maximum step size can preferably be selectively activated and deactivated in order to allow an operator to influence the progression of the optimisation method. The maximum step sizes used by the software preferably are made adjustable as mentioned earlier in the description of this invention.

A third embodiment of the present invention can be made by providing both a minimum step size and a maximum step size for each control variable. In this case, the step size in the direction of a control variable is compared against both the minimum step size and the maximum step size for that control variable. If the step size is greater than the minimum step size and less than the maximum step size for that control variable then for it is accepted, otherwise a new step is calculated which lies between these limits.

A program product in accordance with present invention can be stored as a computer readable code in storage media such as computer memory, disks, CDs or other media suitable for storing computer program products in a readable form. The program product can be stored remotely from the site where the process or system which is to be optimised is positioned and can be accessed by, for example, the Internet, or some other wireless or cable communication means.

What is claimed is:

1. A method for optimizing the response of a process or system comprising K process or system control variables (x, y), wherein the method comprises the steps of:

defining a polyhedron or hyperpolyhedron with L vertices (BWN; FGII; 1–3), where L is greater than K, wherein each vertex (BWN; FGH; 1–3) corresponds to a response of the process or system to a combination of variable (x, y) calculating one or several new vertices (R, C, $C_R$, $C_W$, E, 4–12) based on the previous L vertices;

providing a minimum step size ($x_{min}$, $y_{min}$) for at least one of said variables (x, y);

comparing the step size projected in the direction of said at least one variable (x, y) between said new vertex or vertices (R, C, $C_R$, $C_W$, E, 4–12) and a predefined or calculated or selected point or line or plane or hyperplane against said minimum step size(s);

rejecting one or several calculated new vertices (R, C, $C_R$, $C_W$, E, 4–12) or increasing a step size projected in the direction of said at least one variable (x. y) to said minimum step size ($x_{min}$, $y_{min}$) or above if said step size projected in the direction of said at least one variable (x, y) between said new vertex or vertices (R, C, $C_R$, $C_W$, E, 4–12) and said predefined or calculated or selected point or line or plane or hyperplane is less than said minimum step size ($x_{min}$, $y_{min}$) in order to find a new vertex ($11_{CORR}$, $C_{add}$, $C_{it3}$) which is at least the minimum step size ($x_{min}$, $y_{min}$) from said predefined or calculated or selected point or line or plane or hyperplane and adjusting said variables (x, y) to said new vertex ($11_{CORR}$, $C_{add}$, $C_{it3}$); and/or providing a maximum step size ($x_{max}$, $y_{max}$) for at least one of said variables (x, y); comparing the step size projected in the direction of said at least one variable (x, y) between said new vertex or vertices and a predefined or calculated or selected point or line or plane or hyperplane against said maximum step size(s) ($x_{max}$, $y_{max}$); rejecting one or several calculated new vertices, (R, C, $C_R$, $C_W$, E, 4–12) and decreasing said step size projected in the direction of said at least one variable to said maximum step size ($x_{max}$, $y_{max}$) or less if said step size projected in the direction of said at least one variable (x, y) between said calculated new vertex or vertices (R, C, $C_R$, $C_W$, E, 4–12) and a predefined or calculated or selected point or line or plane or hyperplane is greater than said maximum step size ($x_{max}$, $y_{max}$); and setting the control variables to the values of the calculated vertex or values of the calculated vertices which give a step size greater than the minimum step sizes and/or give a step size less than the maximum step sizes.

2. The method according to claim 1 wherein the method is a modified simplex method for optimizing the response of a system comprising K variables, wherein the method comprises the steps of:

defining a first simplex with K+1 vertices;

calculating a new vertex based on the previous K+1 vertices;

providing a minimum step size for at least one of said variables, comparing the step size projected in the direction of said at least one variable between said new vertex and a predefined or calculated or selected point or line or plane or hyperplane against said minimum step size(s), then rejecting said new vertex and increasing a step size projected in the direction of said at least one variable between said new vertex and said predefined or calculated or selected point or line or plane or hyperplane to said minimum step size or above if said projected step size between said new vertex and said predefined or calculated or selected point or line or plane or hyperplane is less than said minimum step size; and/or providing a maximum step size for at least one of said variables;

comparing the step size projected in the direction of said at least one variable between said new vertex and a predefined or calculated or selected point or line or plane or hyperplane against said maximum step size(s); and rejecting said new vertex and decreasing a step size projected in the direction of said at least one variable and the other vertices to said maximum step size or below if said projected step size between said new vertex and said predefined or calculated or selected point or line or plane or hyperplane is greater than said maximum step size;

setting the control variables to the values of the calculated vertex or values of the calculated vertices which give a step size greater than the minimum step sizes and/or give a step size less than the maximum step sizes.

3. The method according to claim 1, wherein said predefined or calculated or selected point or line or plane or hyperplane is one or more of said previous vertices.

4. The method according to claim 1, wherein said predefined or calculated or selected point or line or plane or hyperplane is a line or plane or hyperplane connecting two or more of said previous vertices.

5. The method according to claim 1, wherein a step size which is to be decreased, is decreased by subtracting the difference in distance in the projected direction between said new vertex and said predefined, calculated or selected point or line or plane or hyperplane from said new vertex to form a further new vertex.

6. The method according to claim 1, wherein a step size which is to be increased, is increased by adding the difference in distance in the projected direction between said new vertex and said predefined, calculated or selected point or line or plane or hyperplane to said new vertex to form a further new vertex.

7. Computer program product containing code for performing the steps in a method in accordance with claim 1.

8. Computer for controlling a process or system wherein said computer contains or executes a computer program product in accordance with claim 7.

9. Computer for controlling a process or system wherein said computer contains a program product in accordance with claim 7.

10. Computer program product code stored on a computer readable medium for performing the method of claim 1 when said program product is run on a computer.

11. The method according to claim 1, characterized in that a step size which is to be decreased, is decreased by multiplying it by a factor which causes the resulting step size to be greater than said minimum step size and/or smaller than said maximum step size in the projected direction between said new vertex and said predefined, calculated or selected point or line or plane or hyperplane and said resulting new vertex.

12. The method according to with claim 1 characterised in that a step size which is to be increased, is increased by multiplying it by a factor which causes the resulting step size to be greater than said minimum step size and/or smaller than said maximum step size in the projected direction between said new vertex and said predefined, calculated or selected point or line or plane or hyperplane and said resulting new vertex.

* * * * *

UNITED STATES PATENT AND TRADEMARK OFFICE
CERTIFICATE OF CORRECTION

PATENT NO. : 6,400,993 B1  Page 1 of 1
DATED : June 4, 2002
INVENTOR(S) : Tomas Oberg It is certified that error appears in the above-identified patent and that said Letters Patent is hereby corrected as shown below:

<u>Title page,</u>
Item [30], insert the following:

-- Foreign Application Priority Data
April 21, 1999  [SE]  Sweden  9901429-2 --

Signed and Sealed this

Twelfth Day of November, 2002

Attest:

Attesting Officer

JAMES E. ROGAN
Director of the United States Patent and Trademark Office